No. 769,908.

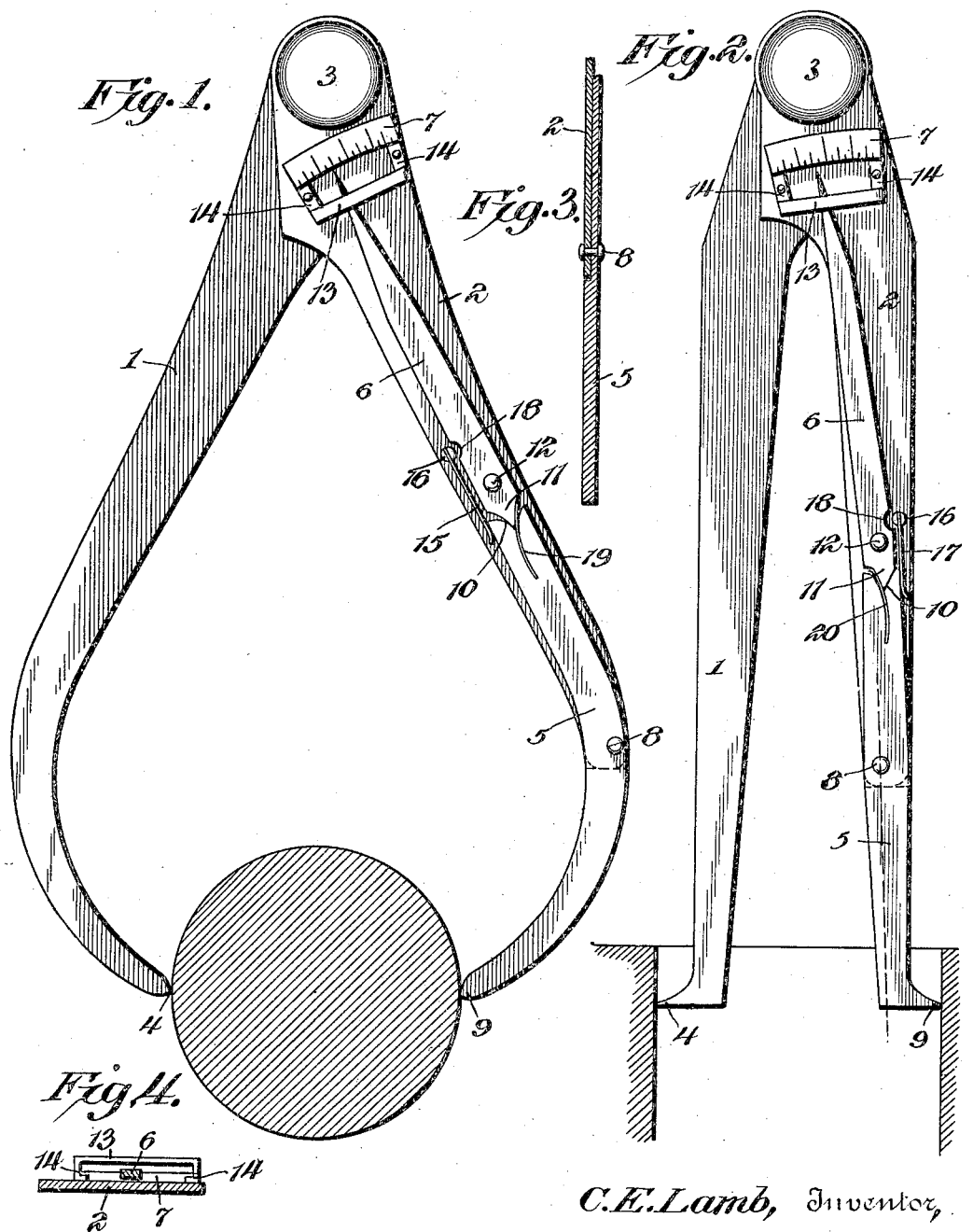

Patented September 13, 1904.

UNITED STATES PATENT OFFICE.

CHARLES ELBRIDGE LAMB, OF GALENA, KANSAS.

CALIPERS.

SPECIFICATION forming part of Letters Patent No. 769,908, dated September 13, 1904.

Application filed July 7, 1903. Serial No. 164,600. (No model.)

*To all whom it may concern:*

Be it known that I, CHARLES ELBRIDGE LAMB, a citizen of the United States, residing at Galena, in the county of Cherokee and State of Kansas, have invented new and useful Calipers, of which the following is a specification.

The invention relates to improvements in calipers.

The object of the present invention is to improve the construction of calipers and to provide a simple, inexpensive, and efficient indicating device designed for indicating variations of measurement and adapted to be readily applied to the ordinary thin calipers without necessitating any change in the general construction thereof and without materially increasing the cost.

A further object of the invention is to provide a sensitive device of this character adapted to indicate on a scale the variations of measurement and capable of enabling a pair of calipers to be handled and operated in the same manner and with the same facility as the ordinary calipers.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is an elevation of a pair of outside calipers provided with an indicating device constructed in accordance with this invention. Fig. 2 is a similar view of a pair of inside calipers. Fig. 3 is a detail sectional view illustrating the manner of mounting the pivoted section or member of the indicating device on the truncated caliper-leg. Fig. 4 is a detail sectional view illustrating the construction of the guard.

Like numerals of reference designate corresponding parts in all the figures of the drawings.

1 and 2 designate legs of a pair of calipers, and the said legs, which are constructed of thin material, like the ordinary calipers, are connected by a suitable pivot 3, which permits the legs of the calipers to open and close. The leg 2 is truncated and terminates short of the outer end of the other leg, 1, which is provided with an engaging point 4.

The truncated leg 2 carries an indicting device comprising a lower or outer section or member 5 and an inner or upper section or member 6, which constitutes a hand or pointer and which is adapted to travel over or operate in connection with a scale 7 for indicating variations of measurement, whereby the slightest difference in the size or diameter of two objects may be readily ascertained. The lower or outer section or member 5 is pivoted between its ends to the truncated leg 2, near the outer end thereof, by a rivet 8 or other suitable fastening device, and the outer arm of the lower section or member of the indicating device is curved inward and terminates in an engaging point 9 and forms a continuation of the truncated leg and is adapted to coöperate with the other leg, 1, in measuring an object, whereby the calipers are adapted to be used in the same manner and with the same facility as the ordinary calipers. The upper arm or portion of the lower section or member of the indicating device is reduced in thickness, as clearly shown in Fig. 3 of the drawings, in order to arrange the parts compactly, and the inner or upper end of the movable section or member is provided with a recess 10 of approximately V shape, receiving a pointed or tapered portion of the hand or pointer 6, which is pivoted near its lower or inner end by a rivet 12 or other suitable fastening device. The lower end of the hand or pointer is tapered to provide the projecting portion 11, and the two sections or members of the indicating device are adapted to articulate, whereby the slightest variation in the size or diameter of an object will be indicated on the scale 7. The adjacent ends of the sections or members may, however, be connected in any other desired manner for enabling the hand or pointer to be operated by and moved simultaneously with the lower section or member.

The scale 7 consists of a series of graduations, and the caliper-leg 2 is provided with a guard 13, receiving the upper end of the hand or pointer and preferably consisting of a thin piece of material bent at its ends to form approximately L-shaped arms or portions 14, which are secured by rivets or other suitable fastening devices to the leg 2 of the calipers. The hand or pointer is normally maintained at one end of the scale by means of a spring 15, mounted at one end on a stud or pin 16 and having its other end bearing against the upper end of the lower section or member 5 at one edge thereof. When the indicating device is applied to outside calipers, as illustrated in Fig. 1 of the drawings, the spring 15 engages the inner edge of the upper end of the lower section or member 5, as clearly shown in Fig. 1 of the accompanying drawings, and when the indicating device is applied to a pair of inside calipers an outside spring 17 is employed. The stud or pin 16 is slotted or grooved to receive the end of the spring, and it also forms a stop for limiting the movement of the hand or indicator in one direction. The hand or indicator is provided with a notch or recess 18, located between its ends at the inner edge and adapted to receive the pin or stud 16 and forming a seat for the same when the parts of the indicator are in their normal position. The outer edge of the inner or lower end of the hand or indicator is engaged by a spring 19, which is adapted to maintain the sections or members in proper relative position and prevent any looseness of the same at the joint, whereby the parts are caused to articulate positively. The spring 19, which is mounted in a slot or bifurcation of the upper end of the lower section or member, engages the outer edge of the lower tapered end of the hand or pointer. When the indicating device is applied to inside calipers, as shown in Fig. 2, an inside spring 20 is employed and is arranged to engage the inner edge of the lower tapered end of the hand or pointer. The lower arm of the hand or pointer is much shorter than the upper arm of the same, and it will be readily apparent that the slightest variation in the size or diameter of two or more objects will be indicated on the scale with absolute accuracy, whereby such variations may be easily corrected. The pivot 12 of the pointer or indicator may be arranged at any desired point to provide the necessary or desired movement of the upper end of the hand or pointer, which is tapered, as shown.

The inside calipers (shown in Fig. 2 of the drawings) are constructed of the same form as the ordinary inside calipers, and the only difference involved in the indicating devices applied to these calipers is the reversal of the springs, as shown.

It will be seen that the indicating device is exceedingly simple and inexpensive in construction, that it is adapted to be applied to the ordinary light thin calipers, and that it does not necessitate any material change in the construction thereof. Furthermore, it will be apparent that the lower section or member of the indicating device forms a continuation of and completes the truncated leg of the calipers and coöperates with the other leg and that the calipers are adapted to be used in the same manner as the ordinary calipers. Furthermore, it will be clear that when the calipers are set for any given size any variation from that size will be accurately indicated by the sensitive hand or pointer, which may be constructed or pivoted to increase or magnify the movement of the engaging portion of the lower section or member to the desired extent, so that the slightest variation between the diameters of two objects may be appreciably indicated on the scale.

What I claim is—

1. A caliper provided with an indicating device mounted on one of the caliper-legs and consisting of a movable section or member having an engaging portion coöperating with the engaging portion of the other caliper-leg, and a pointer or indicator having one end arranged in contact with the inner portion of the movable section or member and connected articulately with and actuated directly by the same, substantially as described.

2. A caliper having a truncated leg and provided with an indicating device comprising a movable section or member pivoted to the truncated leg and having its outer leg completing the said truncated leg and coöperating with the other leg, and a pointer also pivoted between its ends to the truncated leg and having one end arranged in contact with and directly actuated by the inner end of the movable section or member, substantially as described.

3. A caliper having a truncated leg, and an indicating device comprising a movable section or member forming a continuation of and completing the truncated leg and provided with a recess, a hand or pointer also mounted on the truncated leg and extending into the said recess, a stop for limiting the movement of the indicator in one direction, and a spring for holding the indicator normally in engagement with the stop, substantially as described.

4. A caliper having a truncated leg, and an indicating device comprising two sections or members disposed longitudinally of the truncated leg and completing the same, one of the sections or members having a recess to receive the other section or member, a stop for limiting the movement of the indicating device in one direction, and a spring for holding the indicating device normally in engagement with the stop, substantially as described.

5. A caliper having a truncated leg, and an indicating device comprising a movable section or member mounted on the truncated leg and forming a continuation of and completing the same, said movable section being provided at its inner end with a recess, a hand or pointer mounted on the truncated leg and fitting in the said recess, a spring mounted on the movable section or member and engaging one edge of the hand or pointer, a second spring engaging the opposite edge of the movable section or member and mounted on the truncated leg of the caliper, and means for limiting the movement of the indicating device in one direction, substantially as described.

6. A caliper having a truncated leg, and provided at the inner or upper end thereof with a scale, a guard mounted on the truncated leg, and an indicating device extending longitudinally of the truncated leg and composed of sections operatively connected, one of the sections forming a continuation of and completing the truncated leg, and the other section forming a hand or indicator and coöperating with the scale, substantially as described.

In testimony that I claim the foregoing as my own I have hereto affixed my signature in the presence of two witnesses.

CHARLES ELBRIDGE LAMB.

Witnesses:
J. H. LEEMON,
R. C. SCHELLACK.